Jan. 15, 1935.  R. G. AURIEN  1,987,658
BRAKE ARRANGEMENT
Filed July 10, 1930   3 Sheets-Sheet 1
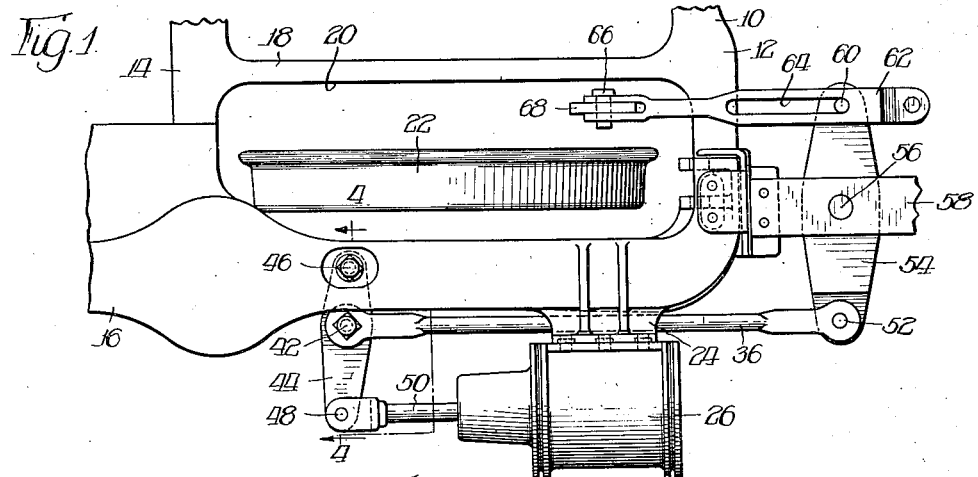
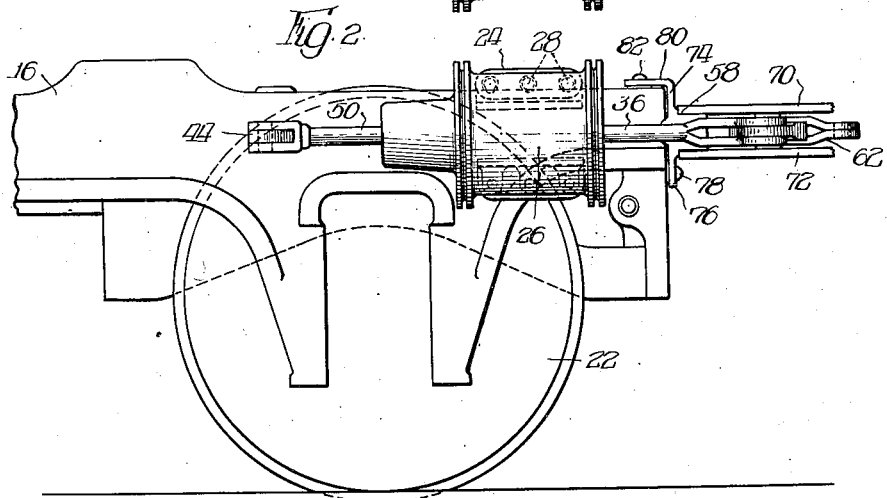
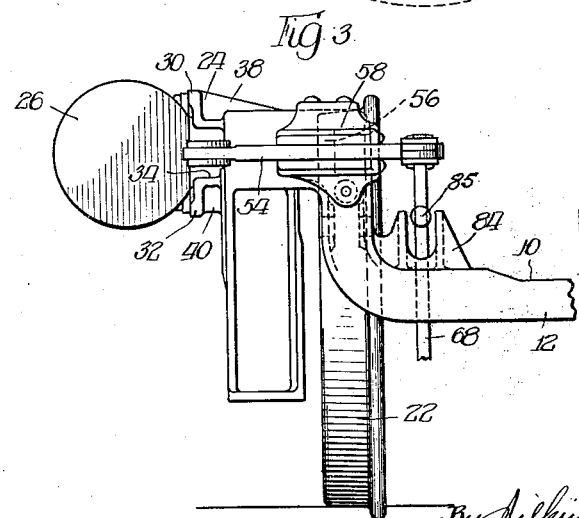
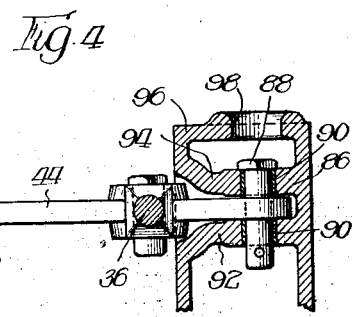
Inventor:
Ray G. Aurien,
By Wilkinson, Huxley, Byron & Knight

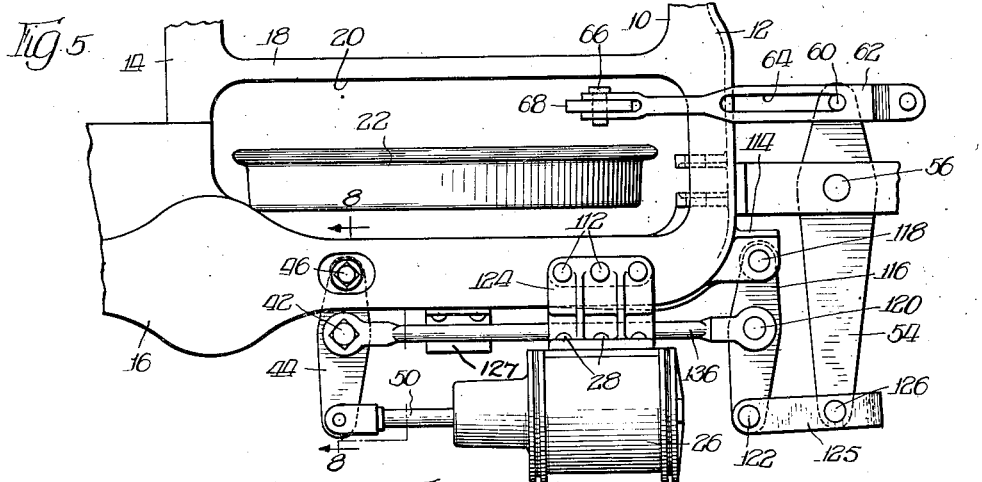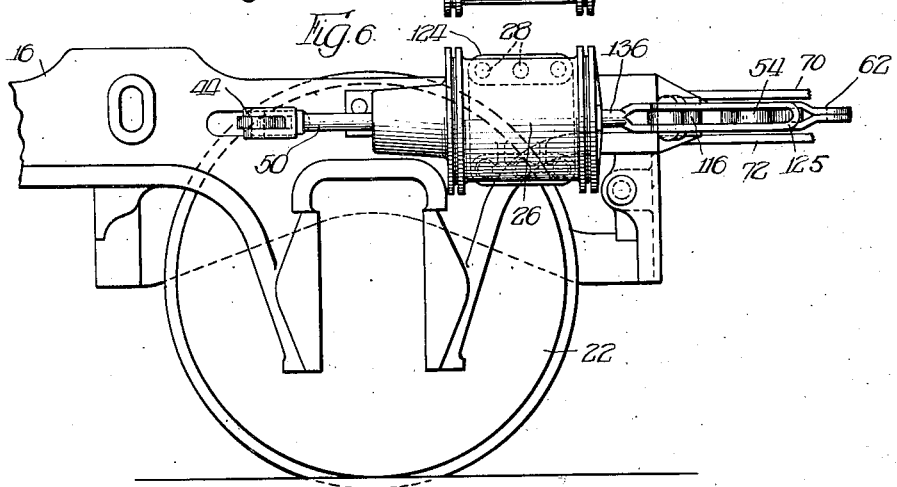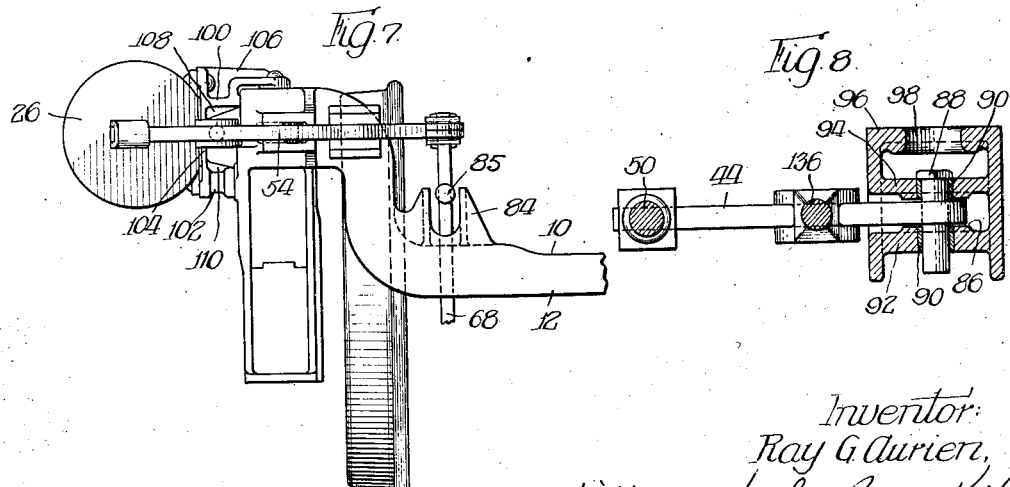

Jan. 15, 1935.   R. G. AURIEN   1,987,658
BRAKE ARRANGEMENT
Filed July 10, 1930   3 Sheets-Sheet 3
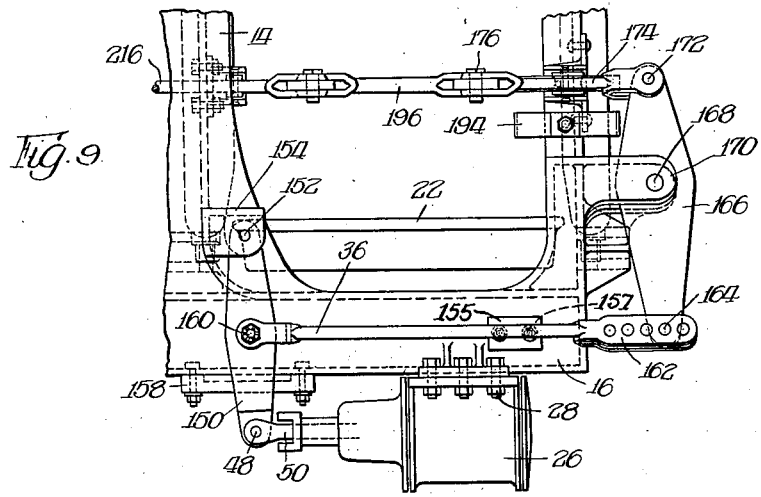
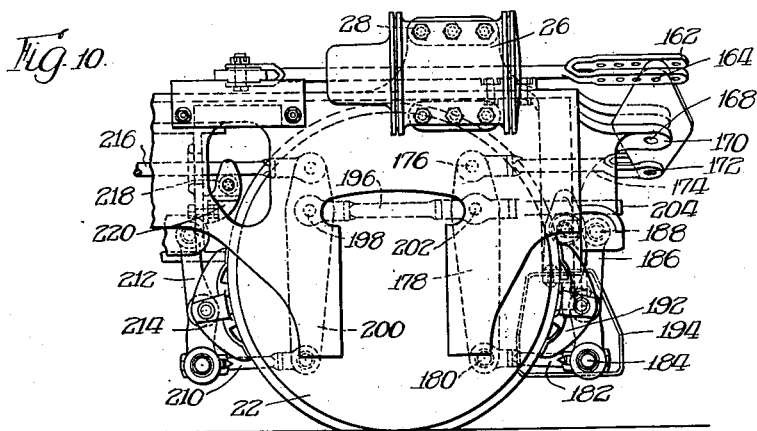
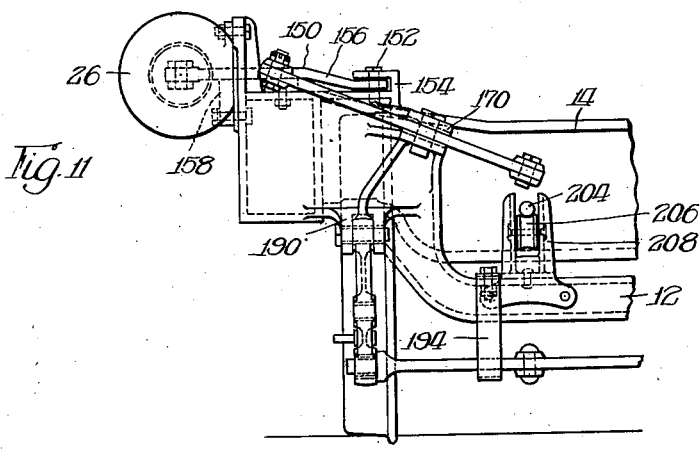
Inventor:
Ray G. Aurien, Patented Jan. 15, 1935

1,987,658

UNITED STATES PATENT OFFICE 1,987,658

BRAKE ARRANGEMENT

Ray G. Aurien, Chicago, Ill., assignor to American Steel Foundries, Chicago, Ill., a corporation of New Jersey Application July 10, 1930, Serial No. 466,971

44 Claims. (Cl. 188—33)

This invention pertains to brake mechanism and more particularly to truck brakes for railway rolling stock.

An object of this invention is to provide simple and compact brake mechanism in which the various parts are accessible and wherein clearance conditions are improved.

Another object of this invention is to provide an improved brake arrangement wherein the mechanism disposed outwardly of the vehicle takes up as little room as possible.

A further object of the invention is to provide brake mechanism for railway rolling stock wherein and whereby the pressures at different points in the mechanism are greatly reduced over the ordinary type of brake mechanism.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a portion of the truck frame and associated brake mechanism embodying the invention;

Figure 2 is a fragmentary side elevation of the mechanism shown in Figure 1;

Figure 3 is a fragmentary end elevation of a portion of the brake mechanism shown in Figure 1, the same being viewed toward the left;

Figure 4 is an enlarged, fragmentary sectional elevation taken substantially in the plane as indicated by the line 4—4 of Figure 1;

Figure 5 is a fragmentary top plan view of a truck frame and modified form of associated brake mechanism;

Figure 6 is a fragmentary side elevation of the mechanism shown in Figure 5;

Figure 7 is a fragmentary end elevation of a portion of the brake mechanism shown in Figure 5, the same being viewed toward the left;

Figure 8 is an enlarged fragmentary sectional elevation taken substantially in the plane as indicated by the line 8—8 of Figure 5;

Figure 9 is a fragmentary top plan view of a portion of a truck frame showing a modified form of brake mechanism embodying the invention;

Figure 10 is a fragmentary side elevation of the mechanism illustrated in Figure 9; and Figure 11 is a fragmentary end elevation of a portion of the brake mechanism shown in Figure 9, the same being viewed toward the left.

Referring first of all more particularly to the application of the invention illustrated in Figures 1 to 4 inclusive, the truck frame 10 is provided with end and intermediate transverse members 12 and 14 cast integral with the side frame members 16, there being provided longitudinal members 18 integral with the cross members 12 and 14 defining the wheel opening 20 in which the wheel 22 is disposed. It is understood that the wheel is a part of a wheel and axle assembly of the standard or improved roller bearing type. While only a portion of the truck frame is described, it is understood that linkage may be used similar to that shown in Patent No. 1,559,503 to Clegg, wherein the same is shown applied to a six-wheel truck. The side frame 16 is shown adjacent the transverse member 12, and is provided with an integral bracket 24 to which the cylinder 26 is secured as by the fastening means 28, though it is to be understood that the cylinder may be cast integral with said bracket. As shown, the bracket is formed of spaced portions 30 and 32 whereby an opening 34 is provided between said portions, said opening being ample to accommodate the pull rod 36. The members 30 and 32 are provided with bracket portions 38 and 40 integral with the truck side frame for bracing the cylinder mounting. The pull rod 36 is pivotally connected as at 42 to the cylinder lever 44, one end of said lever being pivoted as at 46 to the truck side frame, the other end of said lever being pivoted as at 48 to the piston rod 50, said piston rod being operated by a suitable piston disposed in the cylinder 26. The opposite end of the pull rod 36 is pivotally mounted as at 52 to one end of the auxiliary or fulcrum lever 54, said lever being pivoted as at 56, intermediate the ends thereof, to the bracket construction 58. The other end of said lever 54 is pivoted as at 60 to the link 62 through the elongated slot 64, the other end of said link being pivoted as at 66 to a suitable truck lever 68.

The bracket 58 may be formed of a pair of spaced plates 70 and 72 secured to the bracket footing 74, said footing comprising a depending flange 76 riveted to the end member 12 as at 78, and an upwardly extending flange 80 reflanged to be secured as at 82 to the top of the transverse member 12. As shown, the transverse member 12 is depressed and formed with an integral, upwardly extending bracket 84 serving as a guide for the rod 85. In the mounting for the lever 44 in the truck side frame, the frame is preferably recessed as at 86 for the reception of one end of the lever 44 to provide a fulcrum point therefor. The pin 88 forms the pivot point 46 extending through bushings 90 disposed in the embracing portions 92 and 94 forming the slot 86, the upper web 96 of the side frame being apertured at 98 whereby the bolt or pivot pin 88 may be readily inserted or withdrawn.

In the constructions illustrated in Figures 5 to 8 inclusive, substantially the same structure is employed. As shown, however, a separate bracket 124 is used comprising upper and lower members 100 and 102 connected by means of the web 104 forming a seat for the cylinder 26. Suitable braces 106, 108 and 110 are provided for strengthening the upper and lower members, the bracket being secured to the flange as by means of the fastening means 112, the cylinder being fastened by suitable means 28. The end member 12 of the truck frame is provided with an integral bracket 114 to which the auxiliary fulcrum lever 116 is pivoted as at 118. Intermediate the ends of the lever the shortened pull rod 136 is pivoted as at 120, the other end of the lever 116 being pivoted as at 122 to the floating link 125, said link being pivoted as at 126 to the auxiliary lever 54. The side frame is provided with a support in the form of a bracket 127 for supporting the pull rod 136.

In the modification shown in Figures 9 to 11 inclusive, a driver brake cylinder 26 is secured to the main frame 16 by means of the bolts 28, and is provided with a piston rod 50 pivotally mounted as at 48 to the outer end of the cylinder lever 150, said cylinder lever being pivoted at the other end as at 152 to the integral bracket 154 formed on the transverse member 14 of the truck frame. The lever 150 is off-set as at 156, there being provided a cylinder lever guide 158 fastened to the frame for supporting the lever in operative position.

The pull rod 36 is pivoted as at 160 to the lever 150 intermediate the ends thereof, the opposite end of said pull rod being provided with the jaw 162 having adjusting apertures therein adapted to selectively receive pivot means 164 for pivotally mounting the pull rod to the outer end of the auxiliary lever 166, said lever sloping inwardly and downwardly and being pivoted intermediate its ends as at 168 to the bracket 170, said bracket including spaced jaws preferably cast integral with the main frame. The pull rod is supported on the side frame by a support 155 so as to reduce the friction resulting from movement of the rod. The inner end of the auxiliary lever is pivotally mounted as at 172 to the pull rod 174, said pull rod being pivotally mounted as at 176 to one end of the truck lever 178, the other end of said truck lever being pivotally mounted as at 180 to the pull rod 182, which in turn is pivotally mounted as at 184 to the hanger 186, said hanger being pivoted as at 188 to the bracket 190, also cast integral with the frame. The hanger 186 is provided with the brake shoe 192 adapted to have cooperative relation with the tread of the wheel 22, there being provided the strap 194 for emergency use in case a portion of the brake mechanism should become unpivoted.

The rod 196 is pivoted as at 198 to the truck lever 200, said rod being also pivoted as at 202 to the lever 178, and an extension 204 of the rod is adapted to have sliding engagement on the roller 206 pivotally mounted on the bracket 208 secured to the depressed frame member 12, said bracket being provided with upwardly extending jaws guidingly embracing the rod 204. The lever 200 is pivoted to the pull rod 210 which in turn is pivoted to the brake hanger 212 provided with the brake shoe 214, and the truck lever 200 is provided with the pull rod 216 pivoted to the next set of brake mechanism, said rods having sliding engagement with the roller 218 pivotally mounted on the bracket 220, which bracket is also provided with upwardly extending jaws guidingly embracing the rod 216.

In operation of the construction shown in Figures 1 to 4 inclusive, movement of the piston rod 50 moves the lever 44 toward the left as viewed in Figure 1 whereby the pull rod 36 operates the lever 54 to move the link 62 toward the right whereby the brakes associated with the wheel 22 and other brakes (not shown) in the system are set. Movement of the piston rod in an opposite direction serves to move the linkage in the opposite direction.

In the case of the operation of the structure shown in Figures 5 to 8 inclusive, movement is effected by the piston rod 50 operating the link 44 to move the pull rod 136 toward the left as viewed in Figure 5. This movement is imparted to the link 116 to move the link 124 toward the left whereby the auxiliary lever 54 moves the lever 62 toward the right as viewed in this figure. The extra linkage is provided to increase the operating ratio of lever 54 whereby pressure at the fulcrum point 56 is reduced, which is quite important as the position of this point longitudinally is controlled by the slack adjuster (not shown), and the pressures throughout the system must be held within the working range of the device.

In the operation of the construction shown in Figures 9 to 11 inclusive, movement of the piston toward the left as viewed in Figure 9 causes the pull rod 36 to move the inner end of the auxiliary lever 166 toward the right whereby the pivot point 172 is moved toward the right. This movement causes the truck lever 178 to pivot about the fulcrum point 202 to move the pull rod 182 toward the left as viewed in Figure 10, thus applying the brake 192 to the wheel. This movement causes bodily movement of the rod 196 to move the truck lever 200 toward the right. Movement of the lever 200 toward the right as viewed in Figure 10 causes said lever to be retracted by the rod 216 whereby, due to the fact that the length of the arm between the pivot point 196 and the pivot point of the pull rod 210 is greater than that of the arm between the point 198 and the pivot point of the rod 216, the brake shoe 214 will be caused to be applied to the wheel. Movement of the rod 216 acts in a manner as described with respect to rod 174 to apply the succeeding set of brake mechanism. Release of course, or movement of the piston rod toward the right, as viewed in Figure 9, causes reverse operation.

With these types of systems, the power cylinder can be kept very close to the truck frame, and the length of the lever 44 can be greatly reduced over corresponding levers in other systems, with no loss of power transmitted.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a brake mechanism, the combination of a truck lever, a brake cylinder, an auxiliary lever for operating said truck lever connected to said truck lever through a link loosely connected to said auxiliary lever adjacent one end thereof, said auxiliary lever being fulcrumed intermediate the ends thereof, and a pull rod pivoted to said auxiliary lever adjacent the other end thereof, said pull rod being pivotally connected to a cylinder lever intermediate the ends thereof, said cylinder lever being fulcrumed at one end thereof and pivotally connected at the other end thereof to a piston rod operatively associated with said brake cylinder.

2. In a brake mechanism, the combination of a truck lever, a brake cylinder, an auxiliary lever for operating said brake lever connected to said brake lever through a link loosely connected to said auxiliary lever adjacent one end thereof, said auxiliary lever being fulcrumed intermediate the ends thereof, and a link pivoted to said auxiliary lever adjacent the other end thereof and connected to another lever adjacent one end thereof, said second named lever being fulcrumed adjacent the other end and pivoted to a pull rod intermediate its ends, said pull rod being pivotally mounted to a cylinder lever intermediate the ends thereof, said cylinder lever being fulcrumed at one end thereof and pivotally connected at the other end thereof to a piston rod operatively associated with said brake cylinder.

3. In a brake mechanism, the combination of a truck lever, a brake cylinder, an auxiliary lever for operating said truck lever connected to said truck lever through a link loosely connected to said auxiliary lever adjacent one end thereof, said auxiliary lever being fulcrumed intermediate the ends thereof, spaced levers fulcrumed adjacent the ends thereof, a pull rod connecting said spaced levers, and a connection between one of said spaced levers and said auxiliary lever, said other spaced lever being connected to a piston rod operatively associated with said brake cylinder.

4. In a truck frame, the combination of a side member and spaced transverse members, a wheel disposed adjacent said side member, a brake shoe adapted to have braking action with said wheel, a truck lever cooperating with said shoe, a brake cylinder secured to said side member outwardly thereof, an auxiliary lever connected to said truck lever for operating said truck lever, said auxiliary lever being fulcrumed to a bracket cast integral with one of said transverse members, a pull rod pivoted to said auxiliary lever adjacent one end thereof, said pull rod being disposed substantially in the plane of said side member, and a cylinder lever fulcrumed to one of said transverse members and pivoted to said pull rod and to a piston operatively associated with said brake cylinder.

5. In a truck frame, the combination of a side member and spaced transverse members, a wheel disposed adjacent said side member, a brake shoe adapted to have braking action with said wheel, a truck lever cooperating with said shoe, a movable support for said truck lever, a brake cylinder secured to said side member outwardly thereof, an auxiliary lever connected to said truck lever for operating said truck lever, said auxiliary lever being fulcrumed to a bracket cast integral with one of said transverse members, a pull rod pivoted to said auxiliary lever adjacent one end thereof, said pull rod being disposed substantially in the plane of said side member, and a cylinder lever fulcrumed to one of said transverse members at a point disposed substantially in the plane of said wheel, said cylinder lever being pivoted to said pull rod and to a piston operatively associated with said brake cylinder.

6. In a brake mechanism, the combination with a truck having truck levers, of a brake cylinder secured to said truck, an auxiliary lever fulcrumed intermediate its ends to the truck and adapted to operate the truck levers, a pull rod extending lengthwise of the truck between the same and the brake cylinder, a connection between the pull rod and the auxiliary lever, a brake cylinder lever actuated by the brake cylinder and pivoted to the frame on the side of the cylinder opposite the auxiliary lever, said pull rod connecting with said cylinder lever.

7. In a brake mechanism, the combination with a truck frame having side and transverse members, of a truck lever, a brake cylinder secured to a side member, an auxiliary lever fulcrumed to a transverse member and connected to the truck lever at one end, a pull rod positioned between the brake cylinder and the side member supporting the same, said rod having connection with the auxiliary lever, a brake cylinder lever pivoted at its inner end to the frame to the side of the cylinder opposite the auxiliary lever, and a cylinder lever connected at its outer end to the push rod of the cylinder and intermediate its ends to the pull rod.

8. In a brake mechanism, the combination with a truck frame having side and transverse members, of a truck lever, a brake cylinder secured to a side member, an auxiliary lever fulcrumed to a transverse member and connected to the truck lever at one end, a pull rod positioned between the brake cylinder and the side member supporting the same, said rod having connection at one end with the auxiliary lever, and a cylinder lever fulcrumed to said transverse member and connected to the pull rod at its other end and to the piston of the brake cylinder.

9. In a brake mechanism, the combination of a truck frame and a brake cylinder mounted thereon, a lever fulcrumed on said truck frame and pivotally connected directly to the piston of said brake cylinder, a brake rod pivotally connected to said lever, and means on said truck frame for supporting said rod.

10. In brake mechanism, the combination of a side frame member and a bracket formed integral therewith, said bracket including spaced portions forming a passageway, a pull rod extending through said passageway, levers pivoted to the side frame in spaced relation on the respective sides of the cylinder, one lever operatively connected to the piston of the cylinder, and the other lever having connection through an auxiliary lever to a truck lever, said spaced levers being connected by the pull rod.

11. In a brake mechanism for a truck frame, the combination of a side frame member and a bracket formed integral therewith, said bracket including spaced portions forming a passageway, a pull rod extending through said passageway, said bracket positioning a brake cylinder substantially below the highest surface of the truck frame, a lever pivoted to the side frame and connecting with the piston rod of the brake cylinder and with the pull rod, and means connecting the other end of the pull rod with a truck lever.

12. In brake mechanism for a truck frame, the combination of a side frame member and a bracket secured thereto, said bracket having a passageway, a pull rod extending through said passageway, a brake cylinder supported by the bracket substantially below the highest surface of the truck frame, a lever pivoted to the frame and operatively connecting with the brake cylinder, said pull rod being connected intermediate the ends of the lever, and means connecting the other end of the pull rod with a truck lever.

13. In brake rigging, the combination of a truck frame, a wheel, truck levers disposed adjacent opposite sides of said wheel, a connection between said truck levers, a fulcrum lever connected to one of said truck levers, a dead lever pivoted to said truck frame and connected to said fulcrum lever, and means for operating said dead lever.

14. In brake rigging, the combination of a truck frame, a wheel, truck levers disposed adjacent opposite sides of said wheel, means connecting said truck levers, a fulcrum lever connected to one of said truck levers, a dead lever pivoted to said truck frame and connected to said fulcrum lever, and means for operating said dead lever to thereby operate said truck levers.

15. In brake rigging, the combination of a truck frame, a wheel, truck levers disposed adjacent opposite sides of said wheel, a connection between said truck levers, a fulcrum lever connected to one of said truck levers, a dead lever pivoted to said truck frame and connected to said fulcrum lever, and means for operating said dead lever, said means including a brake cylinder the piston of which is connected to said dead lever.

16. In brake rigging, the combination of a truck frame, a wheel, truck levers disposed adjacent opposite sides of said wheel, a fulcrum lever connected to one of said truck levers, a dead lever pivoted to said truck frame and connected to said fulcrum lever, and means for operating said dead lever, said means including a brake cylinder the piston of which is connected to said dead lever to thereby operate said truck lever.

17. In a brake rigging, the combination with a railway car truck comprising a truck frame and a plurality of wheels, of a clasp brake rigging associated with each wheel comprising operatively connected truck levers located adjacent the respective sides of a wheel, a dead lever pivotally mounted on the truck frame and operatively connected to one of said truck levers, a cylinder lever pivotally mounted on the truck frame and operatively connected with said dead lever, and a brake cylinder for actuating said cylinder lever.

18. In a brake rigging, the combination of a truck frame, operatively connected truck levers supported from said frame, a fulcrum lever operatively connected to one of said truck levers, one end of said fulcrum lever being pivoted to said truck frame, a pull rod connected to said fulcrum lever, and a lever pivoted to said truck frame and to said pull rod and operable to operate said brake rigging.

19. In a brake rigging, the combination with a truck frame, a wheel associated therewith, operatively connected truck levers disposed at opposite sides of the wheel, a fulcrum lever connected to one of said truck levers and to said truck frame, a pull rod having pivotal connection at substantially the mid-portion of said fulcrum lever, and a lever pivoted to said truck frame and to said pull rod and operable to operate said brake rigging.

20. In a brake rigging, the combination with a truck frame, a wheel associated therewith, operatively connected truck levers disposed adjacent opposite sides of wheel, a pressure cylinder, a fulcrum lever connected to one of said truck levers, a cylinder lever connected to the frame and at its opposite end to the piston of said pressure cylinder, and a pull rod connecting said fulcrum and cylinder levers.

21. In a brake rigging, the combination with a truck frame, a wheel associated therewith, operatively connected truck levers disposed adjacent opposite sides of said wheel, a fulcrum lever connected to one of said truck levers, a bracket provided on the frame, one end of said fulcrum lever being pivoted to said bracket, a cylinder lever pivoted at its inner end to the frame, a power cylinder secured to said frame and associated with said lever and a pull rod connecting said cylinder and fulcrum levers.

22. In brake rigging, the combination of a truck frame, a wheel, operatively connected truck levers adjacent opposite sides of said wheel, dead levers connected to said truck frame and to one of said truck levers, and means for operating one of said dead levers to thereby operate said truck levers.

23. In brake rigging, the combination of a truck frame, a wheel, truck levers adjacent opposite sides of said wheel, a connection between said truck levers, a fulcrum lever connected to one of said truck levers, a dead lever pivoted to said truck frame and connected to said fulcrum lever, and means for operating said dead lever, said means including a brake cylinder, the piston of which is connected to one end of said dead lever.

24. In a truck brake equipment, the combination with a truck frame having side members, of a system of operatively connected brake elements including a live truck lever carried by the truck frame, the end of the live lever to which power is applied to effect the operation of said system to apply the brakes being movable, a brake cylinder device secured to one of said side members for operating said live lever, a push rod included in said brake cylinder device movable in the same direction as said end of the live lever to apply the brakes, and a plurality of horizontally disposed operatively connected levers pivotally mounted on the truck frame and operatively connecting said push rod to said end of the live truck lever.

25. In a brake rigging, the combination of a truck frame, a wheel associated therewith, truck levers supported on said frame and arranged adjacent opposite sides of said wheel, a pull rod connecting said truck levers, a horizontally disposed dead fulcrum lever pivoted at one end to said frame and connected at its other end to one of said truck levers, a horizontally disposed dead lever pivotally mounted at one end on said frame and slidable thereon, said dead lever being connected to said fulcrum lever, and operating means connected to the other end of said last named lever.

26. In a brake rigging, the combination of a truck frame, a wheel associated therewith, truck levers supported on said frame and arranged adjacent opposite sides of said wheel, a pull rod connecting said truck levers, a dead fulcrum lever pivoted at one end to said frame and connected at its other end to one of said truck levers, a dead cylinder lever pivotally mounted at one end on said frame, a cylinder mounted on said frame adjacent one end thereof, the piston thereof being connected to the other end of said cylinder lever, and a pull rod connecting said cylinder lever to said fulcrum lever.

27. In a brake arrangement, the combination of a truck frame, a cylinder mounted adjacent one end thereof, a cylinder lever pivoted at its inner end to said truck frame, the outer end of said cylinder lever being connected to the piston of said cylinder, a fulcrum lever pivoted at one end to said frame and connected at its other end to brake rigging, and a pull rod connecting said cylinder and fulcrum levers.

28. In a brake arrangement, the combination of a truck frame, a cylinder mounted adjacent one end thereof, a cylinder lever pivoted at its inner end to said truck frame, the outer end of said cylinder lever being connected to the piston of said cylinder, a fulcrum lever pivoted at one end to said frame and connected at its other end to brake rigging, and a rod connected to said cylinder and fulcrum levers intermediate the ends thereof.

29. In a brake arrangement, the combination of a truck frame, a horizontally disposed cylinder mounted thereon, a cylinder lever pivoted at its inner end to said truck frame, the outer end of said cylinder lever being connected to the piston of said cylinder, a transversely disposed fulcrum lever pivoted at its inner end to said frame and connected at its outer end to brake rigging, and a pull rod connecting said cylinder and fulcrum levers.

30. In a brake arrangement, the combination of a truck frame, a horizontally disposed cylinder mounted thereon, a transversely arranged cylinder lever pivoted at its inner end to said truck frame, the outer end of said cylinder lever being connected to the piston of said cylinder, a fulcrum lever pivoted at its inner end to said frame and connected at its outer end to brake rigging, and a pull rod connecting said cylinder and fulcrum levers.

31. In a brake arrangement, the combination of a truck frame, a horizontally disposed cylinder mounted thereon, a cylinder lever pivoted at one end to said truck frame, the other end of said cylinder lever being connected to the piston of said cylinder, a fulcrum lever pivoted at one end to said frame and connected at its other end to brake rigging, and a pull rod connecting said cylinder and fulcrum levers.

32. In a brake arrangement, the combination of a truck frame, a cylinder mounted adjacent one end thereof, a cylinder lever pivoted at its inner end to said truck frame, the outer end of said cylinder lever being connected to the piston of said cylinder, a fulcrum lever pivoted at one end to said frame, a rod connecting said cylinder and fulcrum levers, and a lever pivoted to said truck frame and connected to said fulcrum lever and said brake rigging.

33. In a brake arrangement, the combination of a truck frame, a cylinder mounted adjacent one end thereof, a cylinder lever pivoted at its inner end to said truck frame, the outer end of said cylinder lever being connected to the piston of said cylinder, a fulcrum lever pivoted at one end to said frame, a rod connecting said cylinder and fulcrum levers, and a lever pivoted to said truck frame intermediate the ends of said lever and connected to said fulcrum lever and said brake rigging.

34. In a brake rigging, the combination of a truck frame, a wheel associated therewith, truck levers supported on said frame and arranged adjacent opposite sides of said wheel, a pull rod connecting said truck levers, a horizontally disposed dead fulcrum lever pivoted to said frame and connected to one of said truck levers, a horizontally disposed dead lever pivotally mounted on said frame and slidable thereon, said dead lever being connected to said fulcrum lever, and operating means connected to the other end of said last named lever.

35. In a brake arrangement, the combination of a wheel, brake means associated with said wheel for braking application thereto, a fulcrum lever pivoted adjacent said wheel and connected to said brake means, a dead cylinder lever spaced from said fulcrum lever and connected thereto, and an operating cylinder the piston of which is directly and operatively connected to said cylinder lever.

36. In a brake arrangement, the combination of a wheel, brake means associated with said wheel for braking application thereto, a fulcrum lever pivoted adjacent said wheel and connected to said brake means, a dead horizontal cylinder lever spaced from said fulcrum lever and connected thereto, and an operating cylinder the piston of which is operatively connected to said cylinder lever.

37. In a brake arrangement, the combination of a wheel, brake means associated with said wheel for braking application thereto, a substantially horizontal fulcrum lever pivoted adjacent said wheel and connected to said brake means, a dead cylinder lever spaced from said fulcrum lever and connected thereto, and an operating cylinder the piston of which is operatively connected to said cylinder lever.

38. In a brake arrangement, the combination of a wheel, brake means associated with said wheel for braking application thereto, a substantially horizontal fulcrum lever pivoted adjacent said wheel and connected to said brake means, a dead horizontal cylinder lever spaced from said fulcrum lever and connected thereto, and an operating cylinder the piston of which is directly and operatively connected to said cylinder lever.

39. In a brake arrangement, the combination of a truck frame, a wheel, brake means associated with said wheel for braking application thereto, a lever connected to said frame, a lever spaced therefrom and connected thereto, said levers being disposed transversely relative to said frame, one of said levers being connected to said means, and an operating cylinder having a piston connected to the other of said levers.

40. In a brake arrangement, the combination of a truck frame, a wheel, brake means associated with said wheel for braking application thereto, and spaced levers operatively connected together and disposed transversely relative to said frame, one of said levers being connected to said means, and an operating cylinder having its axis disposed longitudinally of said frame and being provided with a piston connected to the other of said levers.

41. In a brake arrangement, the combination of a truck frame, a wheel, brake means associated with said wheel for braking application thereto, and spaced levers operatively connected together and disposed transversely relative to said frame, one of said levers being pivoted to said frame at its end and the other of said levers being pivoted to said frame intermediate the ends thereof, one of said levers being connected to said means, and an operating cylinder having a piston connected to the other of said levers.

42. In a brake arrangement, the combination of a truck frame, a wheel, brake means associated with said wheel for braking application thereto, and spaced levers operatively connected together and disposed transversely relative to said frame, one of said levers being pivoted to said frame at its end and the other of said levers being pivoted to said frame intermediate the ends thereof, and an operating cylinder having its axis disposed longitudinally of said frame and being provided with a piston connected to the other of said levers.

43. In a brake arrangement, the combination of a truck frame, a wheel, brake means associated with said wheel for braking application thereto, an operating cylinder having a piston, said cylinder being disposed at the side of said truck frame, spaced interconnected levers pivotally connected adjacent a side of said frame, one of said levers being operatively connected to said piston and the other of said levers being connected to said means.

44. In a brake arrangement, the combination of a truck frame, a wheel, brake means associated with said wheel for braking application thereto, an operating cylinder having a piston, means for connecting said cylinder to a side of said truck frame, spaced interconnected levers pivotally connected to said frame and having their outer end disposed adjacent said side of the frame, means for connecting one of said levers to said piston, and means for connecting the other of said levers to said means.

RAY G. AURIEN.

CERTIFICATE OF CORRECTION.

Patent No. 1,987,658.                                                January 15, 1935.

RAY G. AURIEN.

It is hereby certified that error appears in the printed specification of the the above numbered requiring correction as follows: Page 3, first column, lines 13 and 14, claim 2, for "brake" read truck; and that the said Letters Patent should be read with these corrections therein that the same may conform to the record of the case in the Patent Office.

Signed and sealed this 12th day of March, A. D. 1935.

(Seal)                                                     Leslie Frazer
                                                         Acting Commissioner of Patents.